(12) United States Patent
Bamunuarachchi et al.

(10) Patent No.: US 10,935,445 B2
(45) Date of Patent: Mar. 2, 2021

(54) WEARABLE TOUCH BUTTON ASSEMBLY

(71) Applicant: MAS INNOVATION (PRIVATE) LIMITED, Colombo (LK)

(72) Inventors: Kalana Bamunuarachchi, Colombo (LK); Maduka Chandrasiri, Colombo (LK); Vivek Ramchandani, Colombo (LK)

(73) Assignee: MAS INNOVATION (PRIVATE) LIMITED, Colombo (LK)

( * ) Notice: Subject to any disclaimer, the term of this patent is extended or adjusted under 35 U.S.C. 154(b) by 0 days.

(21) Appl. No.: 16/475,843

(22) PCT Filed: Jan. 3, 2018

(86) PCT No.: PCT/SG2018/050001
§ 371 (c)(1),
(2) Date: Jul. 3, 2019

(87) PCT Pub. No.: WO2018/128583
PCT Pub. Date: Jul. 12, 2018

(65) Prior Publication Data
US 2019/0353539 A1    Nov. 21, 2019

(30) Foreign Application Priority Data

Jan. 4, 2017    (SG) .............................. 10201700057P

(51) Int. Cl.
*G01L 1/18* (2006.01)
*H01H 9/04* (2006.01)
*H01H 1/14* (2006.01)

(52) U.S. Cl.
CPC .................. *G01L 1/18* (2013.01); *H01H 9/04* (2013.01); *H01H 1/14* (2013.01); *H01H 2201/02* (2013.01);
(Continued)

(58) Field of Classification Search
CPC ... G01L 1/18; H01H 9/04; H01H 1/14; H01H 2201/02; H01H 2203/0085; H01H 2209/012
(Continued)

(56) References Cited

U.S. PATENT DOCUMENTS 4,356,229 A * 10/1982 Brodnyan ............. A61L 15/225
442/86
5,886,615 A    3/1999 Burgess
(Continued)

FOREIGN PATENT DOCUMENTS

EP    1667182 A1    6/2006
WO    9938173 A1    7/1999
(Continued)

OTHER PUBLICATIONS

Liu, K. et al., "Scratch-Resistant, Highly Conductive, and High-Strength Carbon Nanotube-based Composite Yarns" ACS Nano, 2010, 4 (10), pp. 5827-5834 (8 pages).
(Continued)

*Primary Examiner* — Octavia Hollington
(74) *Attorney, Agent, or Firm* — Osha Bergman Watanabe & Burton LLP

(57) ABSTRACT

Disclosed herein is a flexible and soft material-based pressure sensor and/or switch assembly that can be used for soft goods as a soft switch. The material selection and design enhances the maximum bending ability and squeezing ability of the pressure sensor/switch and the sensor/switch is made to withstand heavy washes while maintaining its functionality of switching with a light touch based on the use of a waterproof stacking assembly that contains a piezoresistant material, electrodes and other components.

17 Claims, 2 Drawing Sheets

(52) U.S. Cl.
CPC ............... *H01H 2203/0085* (2013.01); *H01H 2209/012* (2013.01)

(58) Field of Classification Search
USPC .................................................... 73/862.632
See application file for complete search history.

(56) References Cited

U.S. PATENT DOCUMENTS

| | | | |
|---|---|---|---|
| 6,114,645 A | 9/2000 | Burgess | |
| 6,329,617 B1 | 12/2001 | Burgess | |
| 6,353,934 B1 * | 3/2002 | Tada | A41B 1/00 2/106 |
| 7,365,031 B2 | 4/2008 | Swallow et al. | |
| 8,533,879 B1 * | 9/2013 | Taylor | A47C 27/10 5/713 |
| 8,800,386 B2 * | 8/2014 | Taylor | G01L 1/18 73/862.044 |

FOREIGN PATENT DOCUMENTS

| | | | |
|---|---|---|---|
| WO | 2005/029514 A1 | 3/2005 | |
| WO | 2012/131289 A2 | 10/2012 | |

OTHER PUBLICATIONS

International Search Report issued in PCT/SG2018/050001 dated Apr. 4, 2018 (3 pages).
Written Opinion issued in PCT/SG2018/050001 dated Apr. 4, 2018 (7 pages).

\* cited by examiner

WEARABLE TOUCH BUTTON ASSEMBLY

FIELD OF INVENTION

This invention relates to a touch button assembly that can be incorporated in to wearable technology applications as a highly-washable fabric-based button.

BACKGROUND

The listing or discussion of an apparently prior-published document in this specification should not necessarily be taken as an acknowledgement that the document is part of the state of the art or is common general knowledge.

In the field of e-textiles, one application of which is wearable electronics, electrical and electronic circuitry can be created in or on textiles and apparel by several different methods.

In some wearable electronic applications, it would be useful to be able to incorporate a pressure sensor or an electrical switching apparatus.

There are a number of issues with incorporating a pressure sensor or an electrical switching apparatus to a wearable object. One issue that arises if one makes use of hard dome-shaped pressure sensors/switches, there is a greater potential for discomfort on the part of the user due to the bulk of the apparatus. In addition, such hard-domed structures may also cause issues with freedom or movement and may be vulnerable to getting caught on other objects. Further issues with hard dome-shaped pressure sensors or soft sensors made using pressure sensitive materials are durability and washability. For a truly wearable garment, it is necessary to provide a pressure sensor/switch that is durable for the lifetime of the garment, which inevitably means that the sensor/switch must be able to survive washing (e.g. machine or hand-washing) for around 25 wash cycles (the typical lifetime of a garment).

Embodiments of the present invention seek to solve or alleviate one or more of the above problems, or at least to provide a useful alternative.

SUMMARY OF INVENTION

This invention relates to a touch button assembly that can be incorporated into wearable technology applications as a fabric based push button. The button may be used as a substitute for conventional hard push buttons currently used in wearable technology. The flexible touch button is highly washable and can be used as any conventional part of a garment. It will be appreciated that the button may also be suitable for application on other substrates as well as a garment.

In a first aspect of the invention, there is provided a waterproof and flexible pressure sensor, comprising:
  a pressure-sensitive electrode unit, comprising a first and a second electrode, and a piezoresistive material sandwiched between the first and second electrodes;
  a first and second conductive yarn attached to the first and second electrodes, respectively; and
  a first and a second waterproof composite material, each comprising a fabric on a first surface and a waterproof polymeric material on a second surface, where the pressure-sensitive electrode unit is sandwiched between the second surfaces of the first and second waterproof composite materials, wherein
  a waterproof seal is formed between the waterproof polymeric materials on the second surfaces of the first and second waterproof composite materials, with a water-tight outlet for each of the first and second conductive yarns.

In embodiments of the invention, the fabrics of the first and second composite materials each have a lengthwise grain, where the lengthwise grain of the first composite material fabric may be oriented such that it is perpendicular to the lengthwise grain of the second composite material fabric.

In embodiments of the invention, the pressure-sensitive electrode unit may further comprise a pressure-resistant fabric sandwiched between the piezoresistive material and the first electrode and/or a pressure-resistant fabric sandwiched between the piezoresistive material and the second electrode. In embodiments of the invention having a pressure-resistant fabric:
  (a) the pressure-resistant fabric may be an insulating material and may further comprise at least one hole to enable a conductive connection between the pressure-sensitive conductive material the electrode, optionally wherein the at least one hole is co-axial with the first and/or second electrode and/or the at least one hole has a diameter of from 0.5 mm to 5 mm, such as 2 mm;
  (b) the pressure-resistant fabric is selected from one or more of the group consisting of latex, synthetic rubbers, neoprene, nylon, PVC, nylon-PVC composite, and silicone;
  (c) the pressure-resistant fabric has a thickness of from 0.2 mm to 0.8 mm, such as from 0.3 mm to 0.5 mm, such as 0.4 mm
  (d) the fabrics of the first composite material and the pressure-resistant fabric each have a lengthwise grain, where the lengthwise grain of the first composite material fabric is oriented such that it is perpendicular to the lengthwise grain of the pressure-resistant fabric;
  (e) the fabrics of the first and second composite materials and the pressure-resistant fabric each have a lengthwise grain, where the lengthwise grain of the first composite material fabric is oriented such that it is perpendicular to the lengthwise grain of the second composite material fabric and the pressure-resistant fabric.

In further embodiments of the invention:
  (i) the piezoresistive conductive material is selected from the group consisting of velostat, LTT-SLPA (a piezoresistive and stretchable knitted fabric which is 72% nylon and 28% spandex by Eeonyx), NW170-SLPA (by Eeonyx), Linqstat™, Zoflex™, and acrylic pressure-sensitive adhesives containing carbon black (e.g. velostat);
  (ii) the waterproof polymeric material is selected from one or more of the group consisting of a thermoplastic polyurethane film and water-repellent coating materials (e.g. PTFE and the like);
  (iii) the waterproof seal is a heat-induced seal or seal formed by the use of an adhesive material;
  (iv) the sensor is attached to a flexible or non-flexible substrate, optionally wherein the substrate is a fabric;
  (v) the sensor is capable of withstanding at least twenty garment wash cycles at 40° C., optionally wherein the sensor is capable of withstanding from twenty to 100 garment wash cycles (e.g. from 25 to 50, such as from 30 to 40 wash cycles).

In a second aspect of the invention, there is provided a waterproof and flexible switch system comprising:
  the waterproof and flexible pressure sensor of the first aspect of the invention and any technically sensible combination of its embodiments; and a microcontroller attached to the first and/or second conductive yarn of the waterproof and flexible pressure sensor, wherein the microcontroller is configured to cycle from a first state to a second state upon receipt of a signal from the pressure sensor when the pressure sensor is subjected to a threshold pressure.

In embodiments of the invention, the microcontroller may be configured to cycle between 2 to n states. In certain embodiments, n is an integer of from 3 to 1,000, such as from 3 to 100, or from 3 to 10, such as from 3 to 5.

In a third aspect of the invention, there is provided a device comprising:

the switch system of the second aspect of the invention and any technically sensible combination of its embodiments; and an apparatus controllable by the switch system.

In a fourth aspect of the invention, there is provided a process to form the waterproof and flexible pressure sensor of any one of the first aspect of the invention and any technically sensible combination of its embodiments, comprising the steps of:

(a) providing a pressure-sensitive electrode unit, comprising a first and a second electrode, and a piezoresistive material sandwiched between the first and second electrodes; a first and second conductive yarn attached to the first and second electrodes, respectively; and a first and a second waterproof composite material, each comprising a fabric on a first surface and a waterproof polymeric material on a second surface, where the pressure-sensitive electrode unit is sandwiched between the second surfaces of the first and second waterproof composite materials; and (b) establishing a waterproof seal around a periphery of the pressure-sensitive electrode unit, with a water-tight outlet for each of the first and second conductive yarns, by heat sealing or adhesively bonding the second surfaces of the first and second waterproof composite materials.

DRAWINGS

Example embodiments of the invention will now be described more fully hereinafter with reference to the accompanying drawings. However, the invention may be embodied in different forms and should not be construed as limited to the embodiments set forth herein. Rather, these embodiments are provided so that this disclosure will be thorough, and will convey the scope of the invention to those skilled in the art.

In the drawing figures provided, dimensions may be exaggerated for clarity of illustration. It will be understood that when an element is referred to as being "between" two elements, it can be the only element between the two elements, or one or more intervening elements may also be present. Like reference numerals refer to like elements throughout.

FIG. 2A depicts the top cover fabric 120A as viewed from above, while FIG. 2B depicts the bottom cover fabric 120B as viewed from below.

DESCRIPTION

Figure 1:
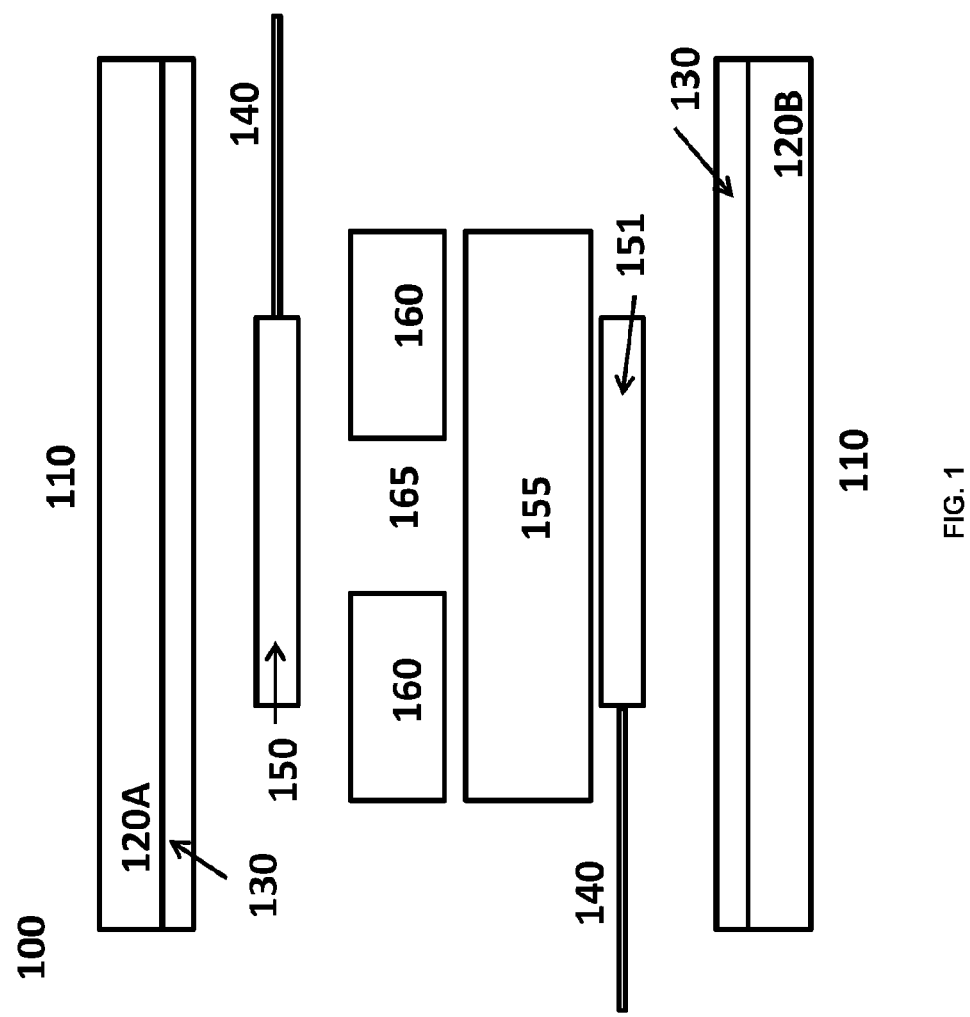
FIG. 1 depicts an exploded cross-sectional view of an embodiment according to the current invention.

This invention relates to a touch button assembly which can be incorporated into wearable technology applications as a fabric based button. However, the technology can potentially be used more widely than this and may be suited for use in anything requiring a pressure sensor or switching apparatus. For example, a keyboard that requires durability and the ability to resist the elements in an outdoor setting for an extended period of time. It is intended that the touch button disclosed herein can be used as a clear substitute for hard push-buttons. This flexible touch button is highly washable and can be incorporated into any conventional part of a garment.

As mentioned hereinbefore, there is disclosed herein a waterproof and flexible pressure sensor, comprising:

a pressure-sensitive electrode unit, comprising a first and a second electrode, and a piezoresistive material sandwiched between the first and second electrodes;

a first and second conductive yarn attached to the first and second electrodes, respectively; and a first and a second waterproof composite material, each comprising a fabric on a first surface and a waterproof polymeric material on a second surface, where the pressure-sensitive electrode unit is sandwiched between the second surfaces of the first and second waterproof composite materials, wherein a waterproof seal is formed between the waterproof polymeric materials on the second surfaces of the first and second waterproof composite materials, with a water-tight outlet for each of the first and second conductive yarns.

When used herein, the term "waterproof" relates to the prevention of the ingress of moisture into an interior compartment of a device. Said interior compartment comprises a sealed pocket formed by sealing the first and second waterproof composite materials together. In the context of this invention, the waterproofing extends to the ability to prevent water ingress into the interior pocket in normal use and under exposure to complete immersion in water under temperatures and pressures that may be found within a washing machine. The term "waterproof seal" should be construed in accordance with the definition of "waterproof" provided hereinbefore.

Waterproof materials that may be mentioned herein include, but are not limited to polymeric layers bonded (e.g. melt-bonded) to the surface of a fabric and water-repellent coating materials (e.g. polymeric treatments of a surface of a fabric). Suitable polymeric layer materials include, but are not limited to thermoplastic polyurethane, silicones and acrylics. Suitable water-repellent coating materials or polymeric treatments include, but are not limited to, polymers comprising one or more of the group consisting of perfluorocycloalkene (PFCA), ethylene, vinyl fluoride, vinylidene fluoride, tetrafluoroethylene (TFE), chlorotrifluoroethylene (CTFE), propylene, hexafluoropropylene (HFP), perfluoropropylvinylether (PPVE) and perfluoromethylvinylether (PMVE). It will be appreciated that when ethylene and/or propylene are present as part of a blend or as part of a co-polymer (including terpolymers) that a fluorocarbon-containing polymeric component is also present. The polymeric treatments may be applied to the fabric by any suitable means, such as by immersion of the fabric in a composition containing the desired polymer(s) or precursors or by plasma treatment of the fabric (e.g. a surface of the fabric) with polymeric precursor compounds.

The waterproof seal may be manufactured by any suitable means. For example, when a thermoplastic polymeric material (such as a thermoplastic TPU) is used, the waterproof seal may be constructed by heat-sealing together the two layers of the thermoplastic polymeric material. Additionally or alternatively, the waterproof layers may be bonded together with a suitable waterproof adhesive (e.g. acrylic- or polyurethane-based glues to promote enhanced adhesion and water-tightness). This latter method may be particularly useful where the waterproof layer is a water-repellent coating material on the surface of the fabric (e.g. an applied fluorinated polymer layer).

When used herein "piezoresistive material" refers to any material that shows a change in the electrical resistivity of the material when mechanical strain is applied. In the context of the current invention, when a threshold pressure is applied to the piezoresistive material, the resistance of the material drops to allow electrical conductivity to occur. When the applied pressure is removed, the resistivity of the piezoresistive material increases to the point where there is minimal or no electrical conductivity through the material and thus, it effectively acts as an insulator. While any piezoresistive material may be used herein, it is preferred that the piezoresistive material be a flexible material. Examples of suitable flexible piezoresistive materials include, but is not limited to, velostat/Linqstat™, a piezoresistive and stretchable knitted fabric LTT-SLPA (72% nylon, 28% spandex by Eeonyx), NW170-SLPA (by Eeonyx), Zoflex™, and acrylic pressure-sensitive adhesives containing carbon black. Further piezoresistive materials that may be mentioned herein include those found in patent publication numbers: WO 99/38173, WO 2005/029514, and WO 2012/131289, which materials are incorporated herein by reference.

FIG. 1 provides an exploded depiction of an example pressure sensor according to the current invention and will be used to describe features of the disclosed sensor. In FIG. 1, the sensor 100 has two fabric composite materials 110, each comprising an outer fabric layer 120A, 120B and an inner waterproof polymeric layer 130. In FIG. 1, these waterproof composite materials 110 together form a sealed pocket to house the pressure sensor in a waterproof environment. To achieve this, the two waterproof polymeric layers 130 are bonded together around a perimeter of the sensor. As noted above, this may be achieved using heat-sealing when the waterproof polymeric layer is made from a thermoplastic polymeric material (e.g. TPU) or by a waterproof adhesive bond between the layers, which may be used when the waterproof polymeric layer is made from a thermoplastic polymeric material or from a water-repellent coating material.

The fabric layers 120A, 120B of the waterproof composite material may be any suitable fabric, which may be made from a natural or a synthetic material. Examples of suitable materials for use in the current invention include, but are not limited to alpaca, angora, cashmere, cotton, flax, hemp, jute, llama, mohair, piña, ramie, silk, sisal, wool, acrylic, aramid, carbon fiber, nylon, polyester, rayon and spandex and blends thereof.

All fabric layers mentioned herein (e.g. the outer fabric layers 120A, 120B and the pressure resistant fabric 160) may be in the form of a woven fabric or a knitted fabric that have a selvedge, a lengthwise grain that runs parallel to the selvedge (which runs parallel to the warp thread direction in a woven fabric) and a crosswise grain that runs perpendicular to the selvedge (which runs parallel to the weft thread direction in a woven fabric). A "selvedge" is a self-finished edge of a fabric, which keeps the fabric from unravelling or fraying.

As noted above, after sealing together, the waterproof composite material layers form a water-proof enclosure around a pressure-sensitive electrode unit and conductive yarns 140. The pressure-sensitive electrode unit comprises two electrodes 150, 151 separated by a piezoresistive material 155 sandwiched therebetween, which may be any of the materials discussed hereinbefore. In the example embodiment depicted in FIG. 1, there is also an additional component, which is a pressure-resistant fabric 160 sandwiched between the piezoresistive material and one of the electrodes (150). The presence of the pressure-resistant fabric 160 may be required between the piezoresistive material 155 and at least one of the electrodes 150, 151.

The electrodes 150, 151 may be made from any flexible electrode material. Examples of suitable flexible electrode materials include, but are not limited to copper and silver yarn-based conductive fabrics and other conductive fabrics constructed from yarns coated with one or more of the group selected from tin, nickel, copper, and cobalt (e.g. tin/copper coated yarns or nickel/copper coated yarns).

The term "yarn" may take its ordinary meaning in the art (long continuous length of interlocked fibres, suitable for use in one or more of the production of textiles, crocheting, knitting, weaving, embroidery and, more particularly sewing), though it is expanded herein to also cover the use of single filaments of a material, such as a metallic filament and is also intended to cover printed lines of material such as conductive inks. Thus, the conductive yarn may be a thin metal wire (e.g. a metal filament suitable for use in one or more of the production of textiles, crocheting, knitting, weaving, embroidery and, more particularly sewing), a metal yarn (i.e. interlocking metal fibers), a yarn or filament made from a conductive polymer, a conductive composite yarn, and a printed conductive ink.

A number of different kinds of conductive composite yarns exist. A first type of conductive composite yarn comprises a normal non-conductive yarn's fibres as a core material that is impregnated with at least one conductive material, such as a metal or a non-metallic conductive material, which latter material may be provided in part in a polymer matrix. A second type of conductive composite yarn comprises a normal non-conductive yarn's fibres as a core material that is then wound together with one or more filaments/fibres of a metal and/or a non-metallic conductive material. A third type of conductive composite yarn comprises a non-metallic conductive material, such as carbon nanotubes or graphene along with a polymeric material, wherein the non-metallic conductive material may be distributed homogeneously throughout the polymeric material to provide a conductive yarn, or the non-metallic conductive material is aligned to form a yarn, with a polymer dispersed within the spaces created in said yarn (e.g. a continuous superaligned carbon nanotube yarn as a conductive framework with polyvinyl alcohol inserted into the intertube spaces of the framework, as described in Liu et al. *ACS Nano*, 2010, 4 (10), pp 5827-5834).

Metals that may be mentioned in aspects and embodiments of the invention include, but are not limited to, iron, copper, silver, gold, aluminium, brass, titanium, tin, and platinum and alloys thereof. For example, a metal alloy that may be mentioned herein is stainless steel.

Conductive inks that may be mentioned include, but are not limited to copper inks, silver inks, graphene based inks, conductive carbon based inks, silver flake inks, dielectric inks, carbon/graphene inks, silver nanoparticle inks, silver nanowire inks, silver coated copper nanoparticle inks, carbon nanotube inks, copper flake inks, copper nanoparticle inks, copper oxide nanoparticle inks, and conductive polymer inks.

It will be appreciated that, in order for the sensor to provide an effect, the conductive yarns exit from the watertight seal and are available to establish electrical contacts with other devices, such as a power source or a microprocessor. In addition, it will be appreciated that the first and second conductive yarns may each be more than one conductive yarn for example each may be from 1 to 10 yarns to enable more complex systems to be created.

When the sensor is not subject to a threshold pressure of the piezoresistive material 155, there is no (or little) conductive communication between electrodes 150 and 151 when they are both in direct contact with the piezoresistive material 155, this is due to the high resistivity of the piezoresistive material 155 when the pressure the sensor is subject to is below the threshold pressure of the piezoresistive material 155. However, when a threshold pressure is applied to the sensor, the resistance piezoresistive material 155 drops and allows conductive communication between the electrodes 150 and 151 thereby allowing an electrical signal to be transmitted.

In certain embodiments, the piezoresistive material 155 may be susceptible to a permanent on bias when it is exposed to a sufficiently high pressure, which may be caused by holding the switch for too long at a sufficiently high pressure (e.g. by placing a weight on top of the sensor or simply pushing the sensor as hard as possible for an extended period of time). The use of a pressure-resistant fabric 160 between at least one of the electrodes 150,151 and the piezoresistive material 155 helps to obviate and/or reduce this on bias from being introduced into the piezoresistive material 155, thereby providing added durability to the sensor.

The pressure-resistant fabric 160 may be any suitable flexible material that can act to absorb and/or spread out the force applied to the sensor upon application of pressure. To achieve this effect, the pressure-resistant fabric may be a thicker fabric that can deform and recover under pressure and so it may have a depth or thickness of from 0.2 mm to 0.8 mm, such as from 0.3 mm to 0.5 mm, such as 0.4 mm. While suitable materials may be conductive, many suitable materials are insulating in nature. When a suitable insulating material is used as the pressure-resistant fabric 160, it will be appreciated that there will need to be at least one hole 165 within the material to enable conductivity. In this configuration, the threshold pressure required to enable conductivity between the electrodes through the piezoresistive material 155 must push at least part of the electrode 150 and/or the piezoresistive material 155 through the hole 165 to create the necessary proximity to provide an electrical contact. Each hole, when present, may have a diameter of from 0.5 mm to 5 mm, such as 2 mm.

It will be appreciated that other arrangements of an insulating pressure-resistant fabric 160 are contemplated which may include a plurality of holes, or an arrangement where an electrical contact may be established around the periphery of the pressure-resistant fabric 160. Multiple holes within the fabric may affect the sensitivity of the sensor and so the introduction of multiple holes may be used when particular sensitivity is required in the sensor. However, it may be useful to have a single hole that is co-axial with one or both of the electrodes to enable a good electrical/conductive contact to be made once pressure is applied to the sensor, whereby the electrodes 150, 151 communicate via the piezoresistant material 155.

Suitable pressure-resistant fabrics include, but are not limited to latex, synthetic rubbers, neoprene, nylon, PVC, nylon-PVC composite, and silicone. It will be appreciated that these materials can deform under pressure and can recover to their original form when the pressure is removed. A suitable thickness for these pressure resistant fabrics may be from 0.2 mm to 0.8 mm, such as from 0.3 mm to 0.5 mm, such as 0.4 mm. When these materials are used, there should be at least one hole unless the footprint of the pressure resistant fabric is smaller than that of the electrodes and the piezoresistive material, such that an electrical connection can be established. When at least one hole is used in these pressure resistant fabrics, each hole may have a diameter of from 0.5 mm to 5 mm, such as 2 mm.

In a particular embodiment of the invention that may be mentioned herein, there may be a single pressure resistant fabric layer 160 made from 0.4 mm thick neoprene between one of the electrodes 150, 151 and velostat/Linqstat™ as the piezoresistive material 155, where the neoprene layer has a single hole that is approximately 2 mm in diameter and is co-axial with the electrodes 150, 151.

Figure 2:
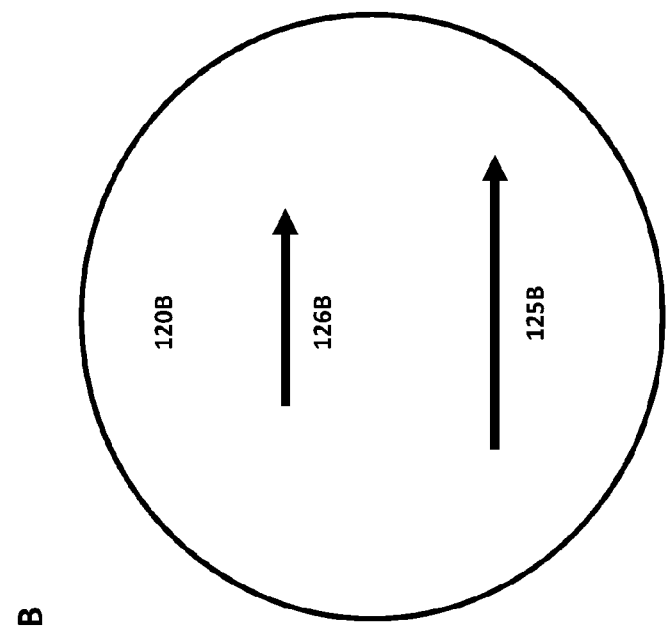
FIG. 2 depicts the respective orientations of the top and bottom fabric covers of the button depicted in FIG. 1.
Figure 2:
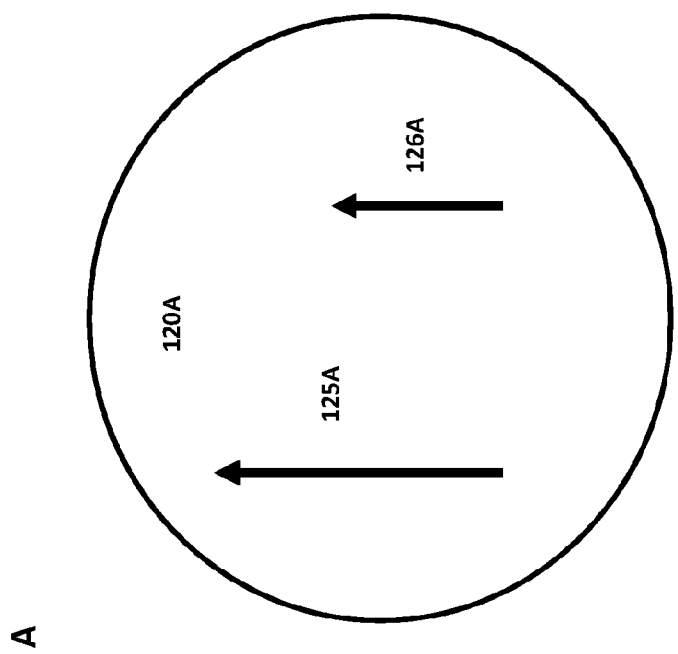

It has been surprisingly found that a greater degree of flexibility can be introduced to the device through careful orientation of the fabric layers 120A, 120B and 160. As depicted in FIG. 2, it has been found that if the lengthwise grain 125A (parallel to the warp thread direction 126A) of the first composite material fabric 120A is oriented to be perpendicular to the lengthwise grain of the second composite material fabric 125B (parallel to the warp thread direction 126B) a greater degree of flexibility may be introduced to the device. Similarly, it has also been found that the same effect can be achieved if the lengthwise grain of the first composite material fabric 120A is oriented to be perpendicular to the lengthwise grain of the pressure-resistant fabric 160. Finally, and more surprisingly, it has been found that when the lengthwise grain of the first composite material fabric 120A is oriented such that it is perpendicular to the lengthwise grain of the second composite material fabric 120B and the pressure-resistant fabric 160 an even greater degree of flexibility may be obtained. Without wishing to be bound by theory, it is believes that the greater flexibility provided by this orientation of the first fabric layer's lengthwise grain relative to the lengthwise grain of the second fabric layer and/or the pressure resistant fabric enhances the device's usability and durability. With respect to usability, the increased flexibility provided by the above arrangements results in a device that is less noticeable to a user wearing a garment that incorporated the device, meaning that the device feels more like a normal garment than would otherwise be the case. In addition, the increased flexibility afforded by the particular orientation of the lengthwise grains in the fabrics may increase the ability of the device to maintain its functionality through multiple machine washing cycles. The above arrangements may also help to avoid the occurrence of a crease forming in the fabric layers. A crease in the fabric layers may increase the stress placed onto the pressure sensitive material used herein, which may cause unwanted and/or erratic triggering of the assembly. Thus, the use of the above arrangements may help to avoid creasing and thereby prevent and/or reduce such unwanted triggering events occurring.

While the sensor can be attached to any suitable substrate, such as a flexible or no-flexible substrate, it will be appreciated that the greatest utility for this sensor is achieved when a flexible substrate is used, as it allows the substrate to retain a great degree of its flexibility. In particular embodiments that may be mentioned herein, the substrate may be a fabric. The method of attachment to the substrate may be by any suitable means, such as by the use of a bonding adhesive or by stitching. Indeed, in certain embodiments, one of the composite fabrics 110 may act as the substrate (or at least the fabric part thereof (120)), such that the sensor is integrally formed into the substrate.

The sensor described hereinbefore is flexible, durable and waterproof and this provides it with the great advantage of being able to be subjected to conditions, such as those found in a washing machine. Thus, in embodiments of the invention, the sensor may be capable of withstanding at least twenty garment wash cycles at 40° C., optionally wherein the sensor is capable of withstanding from twenty to 100 garment wash cycles (e.g. from 25 to 50, such as from 30 to 40 wash cycles).

It will be appreciated that the sensor enables an electrical signal to be sent from the sensor to other apparatus. With that in mind, the sensor may form part of a waterproof and flexible switch system comprising:

the waterproof and flexible pressure sensor as described hereinbefore; and a microcontroller attached to the first and/or second conductive yarn of the waterproof and flexible pressure sensor, wherein the microcontroller is configured to cycle from a first state to a second state upon receipt of a signal from the pressure sensor when the pressure sensor is subjected to a threshold pressure.

In this aspect of the invention, when the sensor is activated it provides a signal to a microprocessor that can then activate a particular action. For example, if the switch system is to be used for a lighting apparatus, the activation of sensor may provide a signal to the microprocessor which may be interpreted as an instruction to turn on the lighting apparatus or to turn it off if the lighting apparatus was already turned on. It will be appreciated that the microcontroller may be configured to cycle between 2 to n states, which may be useful in a lighting apparatus to cycle through a programmed cycle of lighting effects in the lighting apparatus. In certain embodiments, n may be an integer of from 3 to 1,000, such as from 3 to 100, or from 3 to 10, such as from 3 to 5.

A suitable microprocessor for use in the switch system described herein includes, but is not limited to, an Arudino microprocessor and the like.

As will be appreciated the switch system can be applied to control an apparatus, such as a lighting apparatus as discussed above. As such, the switching system comprising the microprocessor and sensor described hereinbefore may be part of a device that further comprises an apparatus controllable by the switch system. As discussed before, the apparatus controlled by the switch system may be a lighting apparatus. Further examples include any function/device associated with a switch, which includes but is not limited to haptic devices, multimedia apparatus controllers, and automobile switching assemblies. In certain embodiments, the switch system may comprise multiple sensors attached to the microprocessor, such that the system may act as a keyboard.

The invention claimed is:

1. A waterproof and flexible pressure sensor, comprising:
    a pressure-sensitive electrode unit, comprising a first and a second electrode, and a piezoresistive material sandwiched between the first and second electrodes;
    a first and second conductive yarn attached to the first and second electrodes, respectively; and
    a first and a second waterproof composite material, each comprising a fabric on a first surface and a waterproof polymeric material on a second surface, where the pressure-sensitive electrode unit is sandwiched between the second surfaces of the first and second waterproof composite materials,
    wherein a waterproof seal is formed between the waterproof polymeric materials on the second surfaces of the first and second waterproof composite materials, with a water-tight outlet for each of the first and second conductive yarns; and
    wherein the fabrics of the first and second composite materials each have a lengthwise grain, where the lengthwise grain of the first composite material fabric is oriented such that it is perpendicular to the lengthwise grain of the second composite material fabric.

2. The waterproof and flexible pressure sensor of claim 1, wherein the pressure-sensitive electrode unit further comprises a pressure-resistant fabric sandwiched between the piezoresistive material and the first electrode and/or a pressure-resistant fabric sandwiched between the piezoresistive material and the second electrode.

3. The waterproof and flexible pressure sensor of claim 2, wherein the pressure-resistant fabric is an insulating material and further comprises at least one hole to enable a conductive connection between the pressure-sensitive conductive material and the electrode.

4. The waterproof and flexible pressure sensor of claim 3, wherein the at least one hole has a diameter of from 0.5 mm to 5 mm.

5. The waterproof and flexible pressure sensor of claim 2, wherein the pressure-resistant fabric is selected from one or more of the group consisting of latex, synthetic rubbers, neoprene, nylon, PVC, nylon-PVC composite, and silicone.

6. The waterproof and flexible pressure sensor of claim 2, wherein the pressure-resistant fabric has a thickness of from 0.2 mm to 0.8 mm.

7. The waterproof and flexible pressure sensor of claim 2, wherein the fabrics of the first composite material and the pressure-resistant fabric each have a lengthwise grain, where the lengthwise grain of the first composite material fabric is oriented such that it is perpendicular to the lengthwise grain of the pressure-resistant fabric.

8. The waterproof and flexible pressure sensor of claim 2, wherein the fabrics of the first and second composite materials and the pressure-resistant fabric each have a lengthwise grain, where the lengthwise grain of the first composite material fabric is oriented such that it is perpendicular to the lengthwise grain of the second composite material fabric and the pressure-resistant fabric.

9. The waterproof and flexible pressure sensor of claim 1, wherein the piezoresistive material is selected from the group consisting of velostat, a piezoresistive and stretchable knitted fabric LTT-SLPA (72% nylon, 28% spandex by Eeonyx), NW170-SLPA (by Eeonyx), Linqstat™, Zoflex™, and acrylic pressure-sensitive adhesives containing carbon black.

10. The waterproof and flexible pressure sensor of claim 1, wherein the waterproof polymeric material is selected from one or more of the group consisting of a thermoplastic polyurethane film and water-repellent coating materials.

11. The waterproof and flexible pressure sensor of claim 1, wherein the waterproof seal is a heat-induced seal or seal formed by the use of an adhesive material.

12. The waterproof and flexible pressure sensor of claim 1, wherein the sensor is attached to a flexible or non-flexible substrate.

13. The waterproof and flexible pressure sensor of claim 1, wherein the sensor is capable of withstanding at least twenty garment wash cycles at 40° C.

14. A waterproof and flexible switch system comprising:
the waterproof and flexible pressure sensor of claim 1; and
a microcontroller attached to the first and/or second conductive yarn of the waterproof and flexible pressure sensor,
wherein the microcontroller is configured to cycle from a first state to a second state upon receipt of a signal from the pressure sensor when the pressure sensor is subjected to a threshold pressure.

15. The waterproof and flexible switch system of claim 14, wherein the microcontroller is configured to cycle between 2 to n states.

16. A device comprising:
the waterproof and flexible switch system of claim 14; and
an apparatus controllable by the waterproof and flexible switch system.

17. A process to form the waterproof and flexible pressure sensor of claim 1, comprising the steps of:
providing a pressure-sensitive electrode unit, comprising a first and a second electrode, and a piezoresistive material sandwiched between the first and second electrodes; a first and second conductive yarn attached to the first and second electrodes, respectively; and a first and a second waterproof composite material, each comprising a fabric on a first surface and a waterproof polymeric material on a second surface, where the pressure-sensitive electrode unit is sandwiched between the second surfaces of the first and second waterproof composite materials,
wherein the fabrics of the first and second composite materials each have a lengthwise grain, where the lengthwise grain of the first composite material fabric is oriented such that it is perpendicular to the lengthwise grain of the second composite material fabric; and
establishing a waterproof seal around a periphery of the pressure-sensitive electrode unit, with a water-tight outlet for each of the first and second conductive yarns, by heat sealing or adhesively bonding the second surfaces of the first and second waterproof composite materials.

* * * * *